United States Patent
Puhakainen et al.

(10) Patent No.: US 7,133,421 B1
(45) Date of Patent: Nov. 7, 2006

(54) METHOD AND EQUIPMENT FOR IDENTIFYING A LOGICAL CHANNEL

(75) Inventors: Pekka Puhakainen, Espoo (FI); Timo Viero, Espoo (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/555,236

(22) PCT Filed: Nov. 24, 1998

(86) PCT No.: PCT/FI98/00921

§ 371 (c)(1),
(2), (4) Date: May 25, 2000

(87) PCT Pub. No.: WO99/29063

PCT Pub. Date: Jun. 10, 1999

(30) Foreign Application Priority Data

Dec. 1, 1997 (FI) .................................... 974381

(51) Int. Cl.
*H04J 3/00* (2006.01)
*H04J 3/12* (2006.01)

(52) U.S. Cl. ............................ 370/498; 370/522

(58) Field of Classification Search ............... 370/345, 370/350, 509, 522, 498; 375/365; 714/774
See application file for complete search history.

(56) References Cited

U.S. PATENT DOCUMENTS

| 5,299,198 | A | * | 3/1994 | Kay et al. ............... 370/347 |
| 5,341,401 | A | * | 8/1994 | Farjh et al. ............. 375/341 |
| 5,384,782 | A | * | 1/1995 | Elms ..................... 714/701 |
| 5,453,997 | A | * | 9/1995 | Roney, IV ............... 714/774 |
| 5,499,246 | A | * | 3/1996 | Cooper .................. 370/345 |
| 5,570,467 | A |   | 10/1996 | Sawyer .................. 455/515 |
| 5,606,548 | A |   | 2/1997 | Vayrynen et al. ......... 370/252 |
| 5,638,408 | A | * | 6/1997 | Takaki .................. 375/341 |
| 5,757,851 | A | * | 5/1998 | Saegusa ................. 375/229 |
| 5,905,733 | A | * | 5/1999 | Solve et al. ............ 370/522 |
| 6,038,238 | A | * | 3/2000 | Jokinen et al. .......... 375/130 |
| 6,097,772 | A | * | 8/2000 | Johnson et al. .......... 370/345 |

FOREIGN PATENT DOCUMENTS

| CA | 2 183 401 | 2/1997 |
| EP | 651 523 | 5/1995 |
| GB | 2 259 633 | 3/1993 |
| WO | WO 94/29851 | 12/1994 |
| WO | WO 95/08152 | 3/1995 |
| WO | WO 96/08895 | 3/1996 |
| WO | WO 96/09704 | 3/1996 |

* cited by examiner

*Primary Examiner*—Kevin C. Harper
(74) *Attorney, Agent, or Firm*—Pillsbury Winthrop Shaw Pittman LLP

(57) ABSTRACT

A method and an equipment implementing the method that allow a logical channel, to which a received burst relates, to be identified with certainty also in demanding operational circumstances. A logical channel relating to a time slot is identified by applying channel decoding. The identification can be a primary identification or a confirming identification taking place after a primary identifier the time slot comprises, preferably a bit map, has been interpreted. If identification based on channel decoding contradicts identification based on the bit map, a receiver can be arranged to indicate logical channel information on the basis of the channel decoding, for instance by changing the bit map, when selected criteria are met, to a bit map conforming to the logical channel identified on the basis of the channel decoding. The invention significantly improves the performance of a receiver of a mobile communications system because a considerable part of misinterpretations relating to the logical channel are avoided.

11 Claims, 4 Drawing Sheets

METHOD AND EQUIPMENT FOR IDENTIFYING A LOGICAL CHANNEL

BACKGROUND OF THE INVENTION

The invention relates to mobile communications systems and particularly to a method and equipment for identifying a logical channel in a radio frame part which may comprise information of one or more logical channels, channel decoding of the information being possible by means of channel decoding methods relating to the different logical channels.

In digital radio systems a physical channel provides a link at the interface between a subscriber terminal and a network. A physical channel substantially comprises a frame part of a selected multiple access technique, the frame part being allocated to data transmission between a particular subscriber terminal and the network. A physical channel can therefore comprise for instance one or more TDMA frame time slots arranged at a specific frequency range, or frame parts separated by means of a CDMA frame code.

Physical channels are utilized by means of various multiplexing techniques whereby logical channels are created on a physical link. The term logical channel refers to a logical data transmission bus between two or more parties, the bus being mapped on an interface between a protocol and a radio system. A mobile communications system or a part thereof can therefore comprise different types of logical channels. Logical channels are typically divided into traffic channels (TCH), which comprise different kinds of traffic relaying channels, and control channels (CCH), which comprise e.g. broadcast control channels, common control channels and dedicated control channels. Speech and circuit-switched data are transferred over the radio interface substantially on traffic channels and signalling and packet data on control channels.

As a rule, a logical channel associated with a received signal can be concluded from the used multiplexing technique, but this does not always apply. A number of mobile communications systems allow signalling, for example, to be also transferred on traffic channels when necessary, a burst to be transmitted then preferably comprising information indicating whether transmission of traffic data or signalling is concerned. This procedure will be hereinafter referred to as stealing.

In the TETRA (TErrestrial, Trunked RAdio) digital mobile communications system a physical channel is substantially comprised of one time slot of a TDMA frame comprising four time slots, the time slot corresponding to one burst transferred over a radio path. A normal uplink or downlink time slot typically comprises two blocks, with a bit map called a training sequence between them. A training sequence is used for indicating features relating to transmission timing and distortion, which are typically important in demodulation, to a receiver.

In the TETRA system two normal 22-bit training sequences differing from one another are defined, the training sequences being used for indicating whether the burst blocks comprise one or two logical channels. The above described stealing from a traffic channel is also indicated by using a training sequence. When a burst comprises a training sequence 1 (TS1), stealing is interpreted not to be in use, and the burst comprises entirely traffic channel data. When a burst comprises a training sequence 2 (TS2), the time slot into which the burst is mapped is interpreted to be either totally or partly stolen for signalling purposes.

In circumstances where reception is subject to fading and noise, it has proved to be most difficult to distinguish training sequences, and thus logical channels relating to a time slot, from one another. If a training sequence TS1 is by mistake interpreted as a training sequence TR2, the receiver concludes that a signalling message is concerned, which causes traffic channel blocks to be lost and decreases data transmission capacity. If a training sequence TS2 is by mistake interpreted as a training sequence TR1, the receiver interprets that traffic channel data is concerned, the transmitted signalling being thereby lost. The possibility that a logical channel can be misinterpreted in this way is most disadvantageous for the operation of the system. Errors in interpretations are particularly problematic in channels in which bit error ratio should be very small to support efficient channel coding.

BRIEF DESCRIPTION OF THE INVENTION

An object of the invention is therefore to provide a method and an equipment implementing the method so as to allow logical channels in received radio frames to be identified with certainty also in demanding operational circumstances.

The objects of the invention are achieved with a method according to any one of independent claims 1, 2 or 3. The invention also relates to a receiver according to any one of independent claims 6, 7, or 8 and to a channel decoding unit according to any one of independent claims 13, 14 or 15. The preferred embodiments of the invention are disclosed in the dependent claims.

The invention is based on the use of channel decoding for identifying a logical channel relating to the information that a frame part to be examined comprises. The identification can be a primary identification, or a confirming identification taking place after a primary identifier, preferably a bit map, said frame part comprises, has been interpreted. If an identification based on channel decoding contradicts an identification based on the bit map, the receiver can be arranged to indicate the logical channel information on the basis of the channel decoding for instance by changing, when selected criteria are met, the bit map to a bit map conforming to the logical channel identified on the basis of the channel decoding. The selected criteria are determined for each application separately after it has been decided which channels are to be primarily identified with certainty and how much resources are to be used for the identification.

The method and system of the invention considerably improve the capacity of a receiver in a mobile communications system because a significant portion of misinterpretations relating to the logical channel are left out.

BRIEF DESCRIPTION OF THE DRAWINGS

In the following the invention will be described in greater detail in connection with preferred embodiments and with reference to the attached drawings, in which.

DETAILED DESCRIPTION OF THE INVENTION

In the following the invention will be described as applied to the TETRA system (TErrestrial Trunked RAdio), the invention not being restricted to the system or to the names of the structural parts. The solution of the invention can also be applied to other digital radio systems in which a logical channel relating to a time slot is not always unambiguously apparent from the frame structure used.

Figure 1:
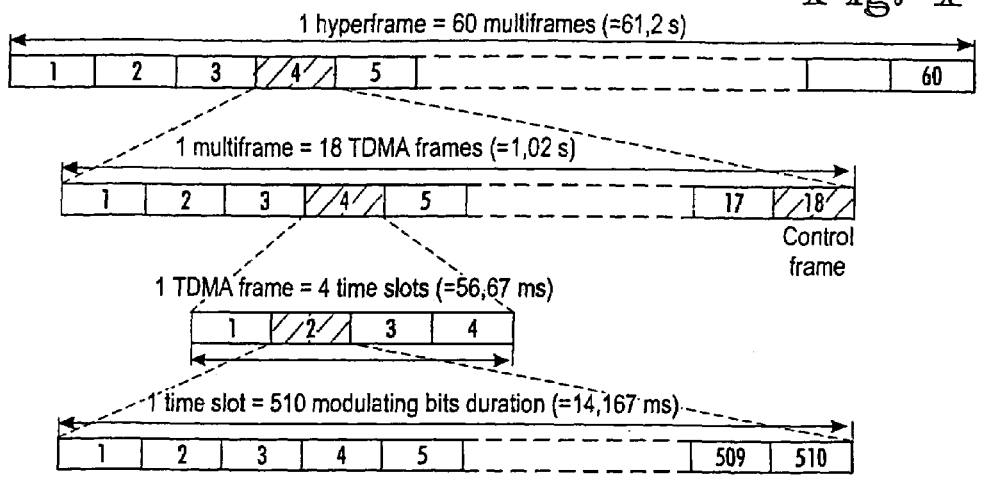
FIG. 1 illustrates a prior art frame structure in the TETRA system.

FIG. 1 shows a frame structure in the TETRA system. In the TETRA system a physical channel is comprised of one TDMA time slot, a TETRA frame comprising a total of four time slots. One time slot comprises 510 bits (255 modulation symbols) and its duration is 14.167 ms. A TETRA superframe, the duration of which is 1.02 s, comprises 18 TETRA frames, the $18^{th}$ frame of the superframe being reserved as a control frame. A TETRA hyperframe comprises 60 TETRA superframes and its duration is 61.2 s.

Figure 2:
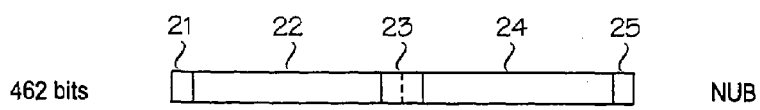
FIGS. 2 and 3 are simplified diagrams illustrating uplink and downlink bursts in the TETRA system according to the prior art.
Figure 3:
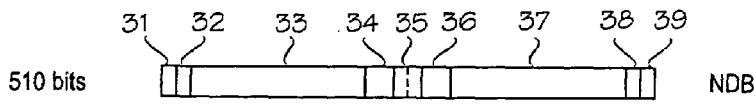

A burst is a sequence modulated by carrier data flow and it describes the physical contents of a time slot. In the TETRA system, eight different bursts are determined. In the following we shall examine a Normal Uplink Burst NUB, which a subscriber terminal uses for data transmission towards a base station; and a continuous Normal Downlink Burst NDB, which the base station uses for data transmission towards the subscriber terminal. Said bursts typically comprise a normal training sequence in the middle of the burst, with blocks that may comprise either traffic or control channel data on each side of the training sequence. FIGS. 2 and 3 are simplified diagrams illustrating uplink and downlink bursts in the TETRA system.

The uplink burst NUB comprises two four-bit tails 21, 25, which are used for equalisation purposes and for reducing filter transient responses at the beginning and end of the bursts. In the middle of the burst there is a normal 22-bit training sequence 23 which indicates whether the burst blocks comprise one or two logical channels, the training sequence also implicitly denoting whether the first burst block or both the blocks comprise signalling data instead of traffic data. Between the tails and the training sequences are left 216-bit data bit blocks 22 and 24.

The downlink burst NDB comprises a plural number of fields, but also this burst substantially comprises a normal training sequence 35 in the middle and, on each side of it blocks 33 and 37 that may, as mentioned, comprise traffic data or control data. In addition, the burst begins and ends with a third 22-bit training sequence 31 which is divided over the interface between two bursts so that there are 12 bits at the beginning and 10 bits at the end of a burst. The third training sequence 31 is followed by two phase control bits 32 after which comes a 216-bit data bit block 33 and 14 broadcast bits 34. The normal training sequence 35 is located in the middle of the burst and it is correspondingly followed by 16 broadcast bits 36, a 216-bit data bit block 37, phase control bits 38 and a third training sequence 39.

When the circumstances for transmission and reception are good, stealing can be identified on the basis of a training sequence without major problems. Measurements have shown, however, that stealing misinterpreted in demanding transmission and reception circumstances significantly impairs channel bit error ratio.

Figure 4:
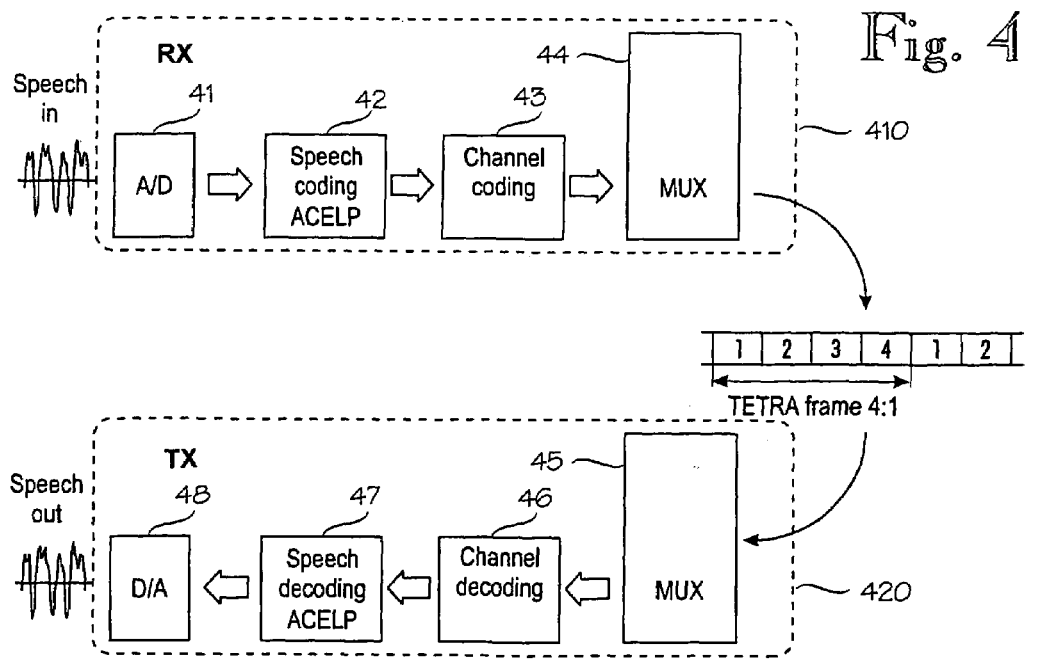
FIG. 4 is a simplified diagram illustrating a TDMA frame structure in the TETRA system and the functional parts of a TETRA transmitter and receiver according to the prior art.

FIG. 4 is a simplified diagram illustrating a TDMA frame structure and the functional parts of a TETRA transmitter 410 and a TETRA receiver 420 in connection with transmission of speech in the TETRA system. Speech is converted in an A/D converter 41 from analog to digital form and packed in an ACELP speech codec 42 for transmission over the radio interface. After speech coding the separate signal packets are secured against data transmission errors in a channel coding unit 43. At channelization (MUX 44) the signals received from different sources are combined for the duration of the data transmission so that they can use a common transmission path. The packed speech is conveyed in consecutive TDMA frames via a specific time slot over the radio interface. At the reception end the packet is opened in a reverse order by means of a multiplexer 45, a channel decoder 46 and a speech decoder 47 and the digitized speech data is converted in a converter 48 into an analog signal which is reproduced as sound. Functional blocks at circuit-switched data traffic channels (TCH/7.2, TCH/4.8, TCH/2.4) of the TETRA system are similarly arranged, except for speech coding and decoding.

In channel coding, redundant data calculated on the basis of source data is added to the source data. In channel decoding a reverse calculation is performed, the redundancy data thus allowing errors caused by the transmission path to be corrected and the success of the channel decoding to be evaluated. In the TETRA system convolution codes are used for error correction and a cyclic redundancy check CRC for the evaluation of the success of channel decoding. The present embodiment is based on that CRC calculation allows evaluating, with great accuracy, whether a received message has been correctly or incorrectly decoded. For instance, the probability of an STCH CRC not detecting that a message is incorrectly decoded is of the order 0.00001.

Figure 5:
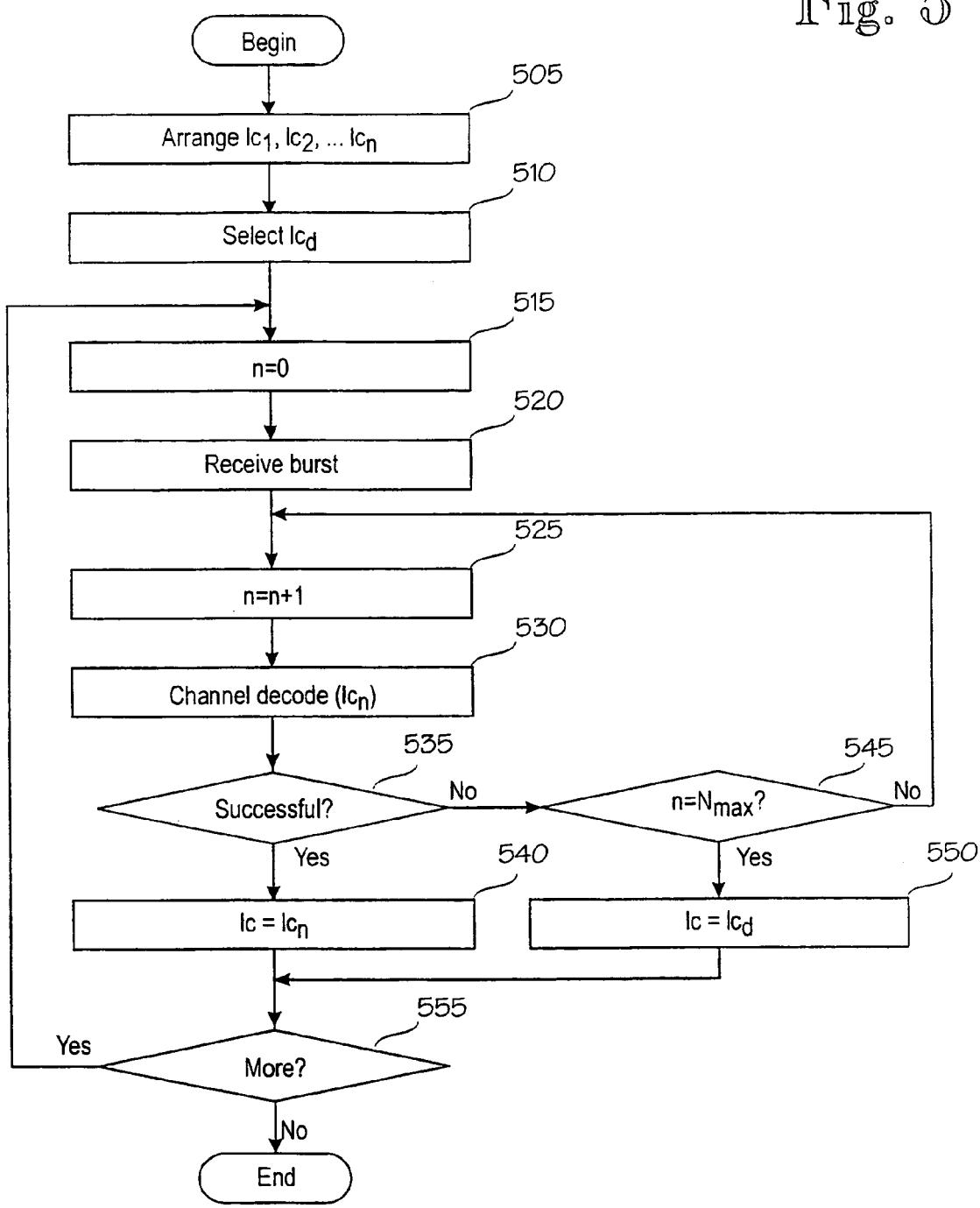
FIG. 5 is a flow diagram illustrating a basic principle of the invention.

FIG. 5 is a block diagram illustrating a basic principle of the invention on a general level: the use of channel decoding for identifying a logical channel. At step 505 channel types, the total number of which is $N_{max}$, are arranged into a predetermined order, preferably according to the likelihood of occurrence. In other words, if incoming bursts are most likely to be traffic data and next likely to represent specific signalling data, the logical channel arranged for traffic data will be lc1, the logical channel arranged for signalling data will be lc2, etc. At step 510 a logical channel default value lcd is selected, i.e. the channel to which the data of a burst is interpreted to relate to if identification based on channel decoding fails. At step 515, a channel indicator n is set at zero, i.e. the identification is preferably started from the most likely alternative. After a burst is received (step 520), a first channel alternative will be examined by moving the indicator to the first alternative (step 525). The received burst is channel decoded by applying a channel decoding algorithm (step 530) associated with the selected logical channel, after which the success of the channel decoding is checked (step 535). If channel coding by means of the algorithm in question succeeded, the burst is interpreted to comprise information relating to the logical channel concerned (step 540). If channel decoding by means of the method in question failed, it is checked whether all possible channel alternatives have been used (step 545). If not, the process moves to step 525 where the next channel alternative will be examined. If all possible alternatives have been used, the burst is interpreted to comprise information relating to a selected logical channel determined as the default value (step 550). The identification of the next burst starts again with the most likely alternative, so if reception continues (step 555) the process moves to step 515 where the indicator is set at zero to indicate the first channel alternative to be checked.

Figure 6:
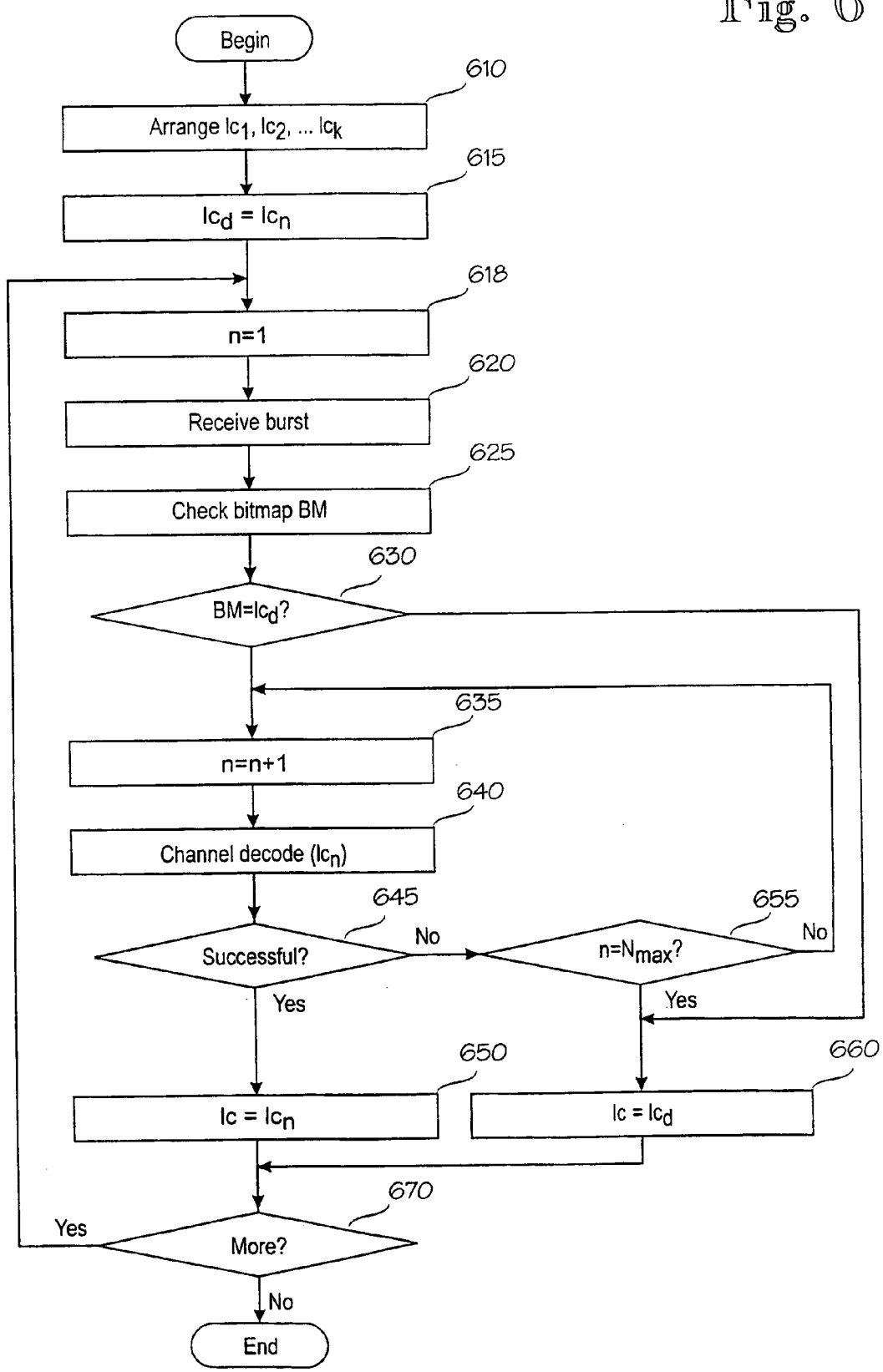
FIG. 6 is a flow diagram illustrating a solution of the invention in a case in which a received time slot comprises the information of a logical channel relating to the time slot.
Figure 7:
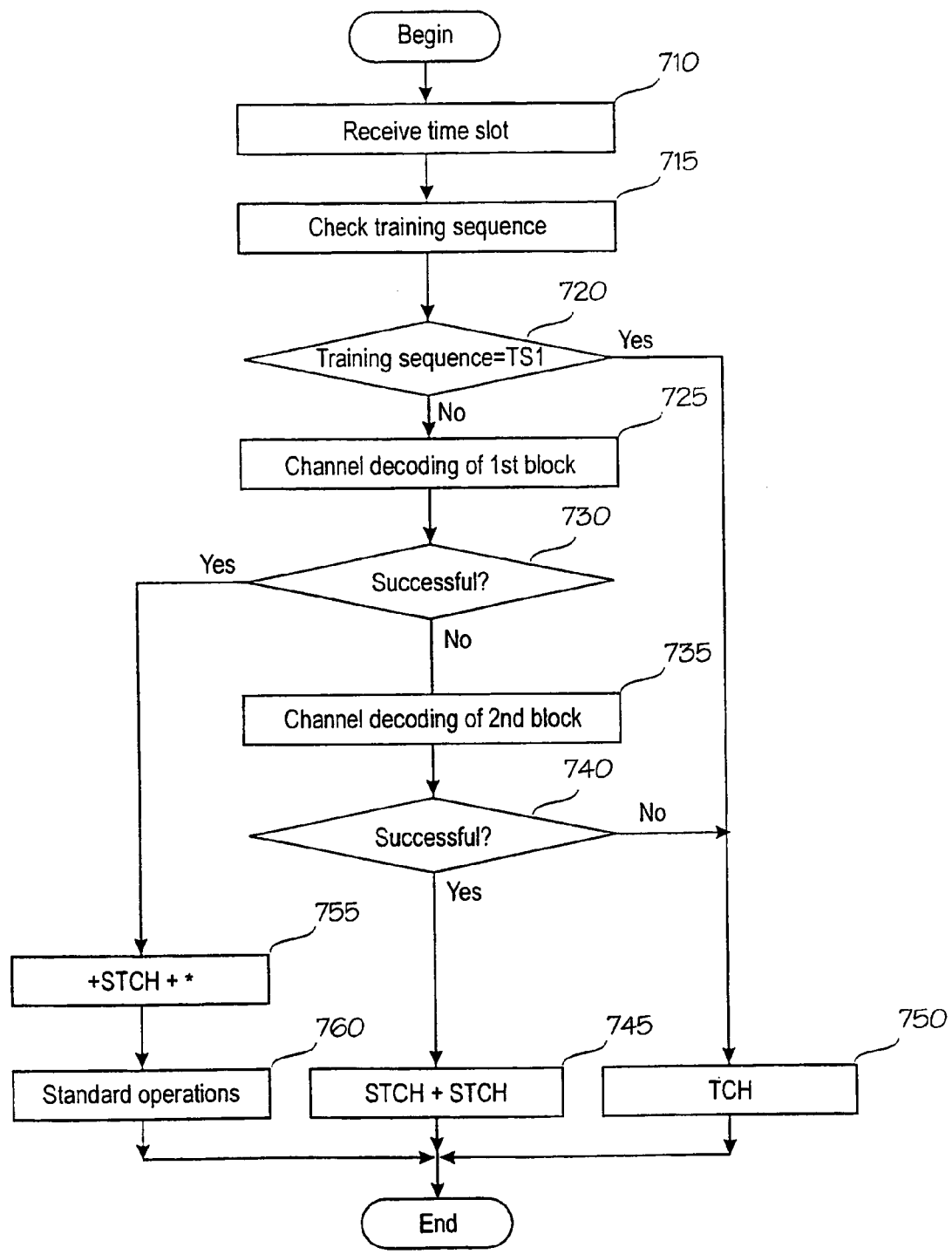
FIG. 7 is a flow diagram illustrating the application of the method of the invention to the detection of stealing in the TETRA system.

The above described embodiment illustrates the basic idea of the invention in a simplified manner, i.e. without taking into account the logical channel information the burst possibly comprises. The block diagram in FIG. 6 allows a situation to be examined in which the received burst comprises the information of the logical channel relating to the burst, the information being also utilized. At step 610 the channels are arranged into a predetermined order in a manner described at step 505 in FIG. 5. At step 615 the channel type used as the default value is determined and at step 618 the channel indicator is set to indicate the first channel alternative. The information relating to the logical channel, preferably a bit map, is checked (step 625) from the received burst (step 620). If the bit map shows that the burst relates to the logical channel determined as the default value, examination by means of channel decoding is not needed, but the burst can be directly interpreted to comprise information relating to the default value channel (step 660). If the information relating to the logical channel refers to another channel than the default value channel, the channel alternative arranged next in order will be examined (step 635) by moving the channel indicator. At step 640 the burst is channel decoded by applying a channel decoding algorithm (640) relating to the logical channel indicated by the channel indicator, after which the success of the channel decoding is checked (step 645). If the channel decoding succeeded, the burst is interpreted to comprise information relating to the logical channel concerned (step 650). If the channel decoding failed, it is checked whether all possible channel alternatives have been used (step 655). If there are alternatives that have not been used, the process continues to the next alternative by an increase of the channel indicator (to step 635). If all the alternatives have been used, the predetermined default channel is interpreted as the logical channel (step 660). The identification of the next burst starts again with the most likely alternative, so if reception continues (step 670) the process moves to step 618 where the indicator is set to indicate the first channel alternative to be checked. FIG. 7 illustrates the method of the invention applied in the TETRA system to the identification of stealing in a received time slot. As described above, stealing is indicated in the TETRA system by means of a training sequence conveyed between the blocks of specific bursts. If the training sequence is TS1, the receiver interprets the whole time slot to comprise traffic channel TCH data. If the training sequence is TS2, the receiver interprets the time slot to be divided into two blocks, the first one of which is interpreted as stolen, i.e. to comprise signalling data of a channel STCH. The other block can comprise either traffic channel data (STCH+TCH) or signalling data (STCH+STCH). The receiver concludes which of the two situations is concerned on the basis of MAC (Medium Access Control) level headers, i.e. in a manner not dependent on the training sequence.

Since only two channel alternatives are possible in the present case, FIG. 7 shows the reception of one time slot in detail. Based on the reference indications used in the flow diagrams of FIGS. 5 and 6, FIG. 7 shows an embodiment in which N=2; lc1=TCH, corresponding to the training sequence TS1; and lc2=STCH, corresponding to the training sequence TS2. A traffic channel TCH is the default channel. At step 710 a time slot is received from which a training sequence is identified (step 715). If the training sequence is TS1, which is mostly the case in radio communications, the time slot can be interpreted to comprise traffic data, i.e. the logical channel is lc1=TCH (step 750). If the training sequence is not identified as sequence number one, a channel decoding determined for a stolen block will be performed to the first block in the time slot, the channel decoding comprising convolution decoding and a cyclic redundancy calculation STCH—CRC (step 725). If the channel decoding succeeds (step 730), it is interpreted that stealing is concerned (step 755) and reception continues on the basis of normal system measures (step 760). But if the channel decoding fails, an attempt will be made to channel decode a second block by applying said channel decoding method determined for a stolen block (step 735). If the channel decoding succeeds (step 740), it can be concluded that stealing is concerned and, further, that the stealing concerns the whole time slot (STCH+STCH) (step 745). If the STCH channel decoding of the second block also fails, the training sequence is considered as misinterpreted. It can therefore be concluded that the time slot concerned is a traffic channel TCH, and the time slot can thus be forwarded identified as a traffic channel. This can be carried out for instance by changing TS1 as the training sequence of the time slot.

In a problem situation such as the one described above where due to demanding communications circumstances a training sequence TS1 is misinterpreted as a training sequence TS2, the above described method allows a TCH time slot to be saved, whereas otherwise it would be lost. A more accurate interpretation of the logical channel, particularly as regards traffic channels, significantly improves the operational features offered by the system. The advantages become particularly apparent in data transmission requiring low bit error ratios. In addition, improved quality of speech is obtained.

On the other hand, if the inventive method is applied to an STCH which is thereby changed to a traffic channel TCH, signalling is not essentially affected, because the change is made only after the channel decoding of the received STCH time slot has failed in both time slot blocks. Likewise, speech is not essentially affected either because the misinterpretation of the STCH channel as a TCH channel is substantially eliminated when speech decoding is applied; the speech CRC probably detects that the time slot in question is not a real TCH time slot.

It is apparent to a person skilled in the art that as technology advances, the basic idea of the invention can be implemented in various ways. The invention and its embodiments are therefore not restricted to the above described examples but they can vary within the scope of the claims.

The invention claimed is:

1. A method for ensuring that stealing is detected in a time slot or a time slot part, the time slot including a training sequence that indicates stealing, the method comprising:
   reading of said training sequence from the received time slot,
   channel decoding, in response to stealing being indicated by said training sequence, a first time slot block by applying a channel decoding method relating to stealing;
   channel decoding, in response to the channel decoding of said first block failing when the channel decoding method relating to stealing is applied, a second time slot block by applying a channel decoding method relating to stealing;
   interpreting, in response to the channel decoding of both the first and the second block failing when the channel decoding method relating to stealing is applied, the time slot to comprise traffic channel data; and arranging, in response to the channel decoding of both the first and the second block failing when the channel decoding method relating to stealing is applied, a training sequence indicating a traffic channel as the training sequence.

2. The method of claim 1, further comprising interpreting, in response to the channel decoding of the latter time slot block succeeding when the channel decoding method relating to stealing is applied, said time slot as a whole to comprise control channel data.

3. A receiver functioning in a radio system, the receiver comprising a unit performing channel decoding, the unit being arranged to:

read from a received time slot a training sequence indicating stealing;

channel decode, in response to stealing being indicated by said training sequence, a first time slot block by applying a channel decoding method relating to stealing;

channel decode, in response to the channel decoding of said first block failing when the channel decoding method relating to stealing is applied, a second time slot block by applying the channel decoding method relating to stealing;

interpret, in response to the channel decoding of both the first and the second block failing when the channel decoding method relating to stealing is applied, the time slot to include traffic channel data, wherein the unit is arranged to change, in response to the channel decoding of both the first and the second block failing when the channel decoding method relating to stealing is applied, a training sequence indicating a traffic channel as the training sequence.

4. The receiver of claim 3, wherein the unit is arranged to interpret, in response to the channel decoding of the latter time slot block succeeding when the channel decoding method relating to stealing is applied, said time slot as a whole to include control channel data.

5. A channel decoding unit for connection to a receiver in a radio system, the unit being configured to:

read from a received time slot a training sequence indicating stealing;

channel decode, in response to stealing being indicated by said training sequence, a first time slot block by applying a channel decoding method relating to stealing;

channel decode, in response to the channel decoding of said first block failing when the channel decoding relating to stealing is applied, a second time slot block by applying the channel decoding method relating to stealing; and interpret, in response to the channel decoding relating to both the first and the second block failing when the channel decoding method relating to stealing is applied, the time slot to comprise traffic channel data, wherein the unit is arranged to change, in response to the channel decoding of both the first and the second block failing when the channel decoding method relating to stealing is applied, a training sequence indicating a traffic channel as the training sequence.

6. The unit of claim 5, wherein the unit is arranged to interpret, in response to a channel decoding of the latter time slot block succeeding when the channel decoding method relating to stealing is applied, said time slot as a whole to include control channel data.

7. The receiver of claim 3, wherein the receiver is part of a base station of a mobile communications system.

8. The receiver of claim 3, wherein the receiver is part of a subscriber terminal of a mobile communications system.

9. A channel decoding unit for connection to a receiver in a radio system, the unit being configured to:

read from a received time slot a training sequence indicating stealing;

channel decode, in response to stealing being indicated by said training sequence, a first time slot block by applying a channel decoding method relating to stealing;

channel decode, in response to the channel decoding of said first block failing when the channel decoding relating to stealing is applied, a second time slot block by applying the channel decoding method relating to stealing; and interpret, in response to the channel decoding relating to both the first and the second block failing when the channel decoding method relating to stealing is applied, the time slot to comprise traffic channel data, wherein the unit is arranged to interpret, in response to a channel decoding of the latter time slot block succeeding when the channel decoding method relating to stealing is applied, said time slot as a whole to comprise control channel data.

10. The unit of claim 5, wherein the unit is part of a base station of a mobile communication system.

11. The unit of claim 5, wherein the unit is part of a subscriber terminal of a mobile communication system.

* * * * *

UNITED STATES PATENT AND TRADEMARK OFFICE
CERTIFICATE OF CORRECTION

PATENT NO. : 7,133,421 B1  Page 1 of 1
APPLICATION NO. : 09/555236
DATED : November 7, 2006
INVENTOR(S) : Pekka Puhakainen and Timo Viero It is certified that error appears in the above-identified patent and that said Letters Patent is hereby corrected as shown below:

Please correct the Assignee Name found on: Title Page; should read;

Page 1
Column 1
Field 73

(73) Assignee: EADS SECURE NETWORKS OY, Helsinki (FI)

Signed and Sealed this

Eighth Day of July, 2008

JON W. DUDAS
*Director of the United States Patent and Trademark Office*